United States Patent [19]
Strathaus

[11] 3,777,654
[45] Dec. 11, 1973

[54] ROASTING PAN
[76] Inventor: John Strathaus, 11835 Highwater Rd., Granada Hills, Calif.
[22] Filed: July 20, 1971
[21] Appl. No.: 164,287

[52] U.S. Cl. .................................. 99/419, 269/15
[51] Int. Cl. ...................... A47j 37/04, A22c 17/02
[58] Field of Search ...................... 99/419, 420, 421, 99/425, 446; 146/215, 216, 217, 218; 269/15

[56] References Cited
UNITED STATES PATENTS

| | | | |
|---|---|---|---|
| 1,344,915 | 6/1920 | Love | 99/421 V |
| 2,942,639 | 6/1960 | Margolis | 146/215 |
| 3,030,994 | 4/1962 | Wysowski | 146/215 |
| 190,688 | 5/1877 | Mathewson | 146/215 |
| 1,031,117 | 7/1912 | Hilker | 146/215 |
| 1,313,900 | 8/1919 | Kling | 146/215 |
| 2,963,957 | 12/1960 | Tashman | 99/421 V |

FOREIGN PATENTS OR APPLICATIONS

| | | | |
|---|---|---|---|
| 381,987 | 10/1932 | Great Britain | 99/419 UX |

*Primary Examiner*—Harvey C. Hornsby
*Assistant Examiner*—Arthur O. Henderson
*Attorney*—Lyon & Lyon

[57] ABSTRACT

A roasting pan having a center carving section made from hardwood. This hardwood center has provision for a set of metal prongs to secure large pieces of meat to the pan. The center may also be repositioned to provide a substantially flat surface for roasting flat pieces of meat such as steak.

6 Claims, 5 Drawing Figures

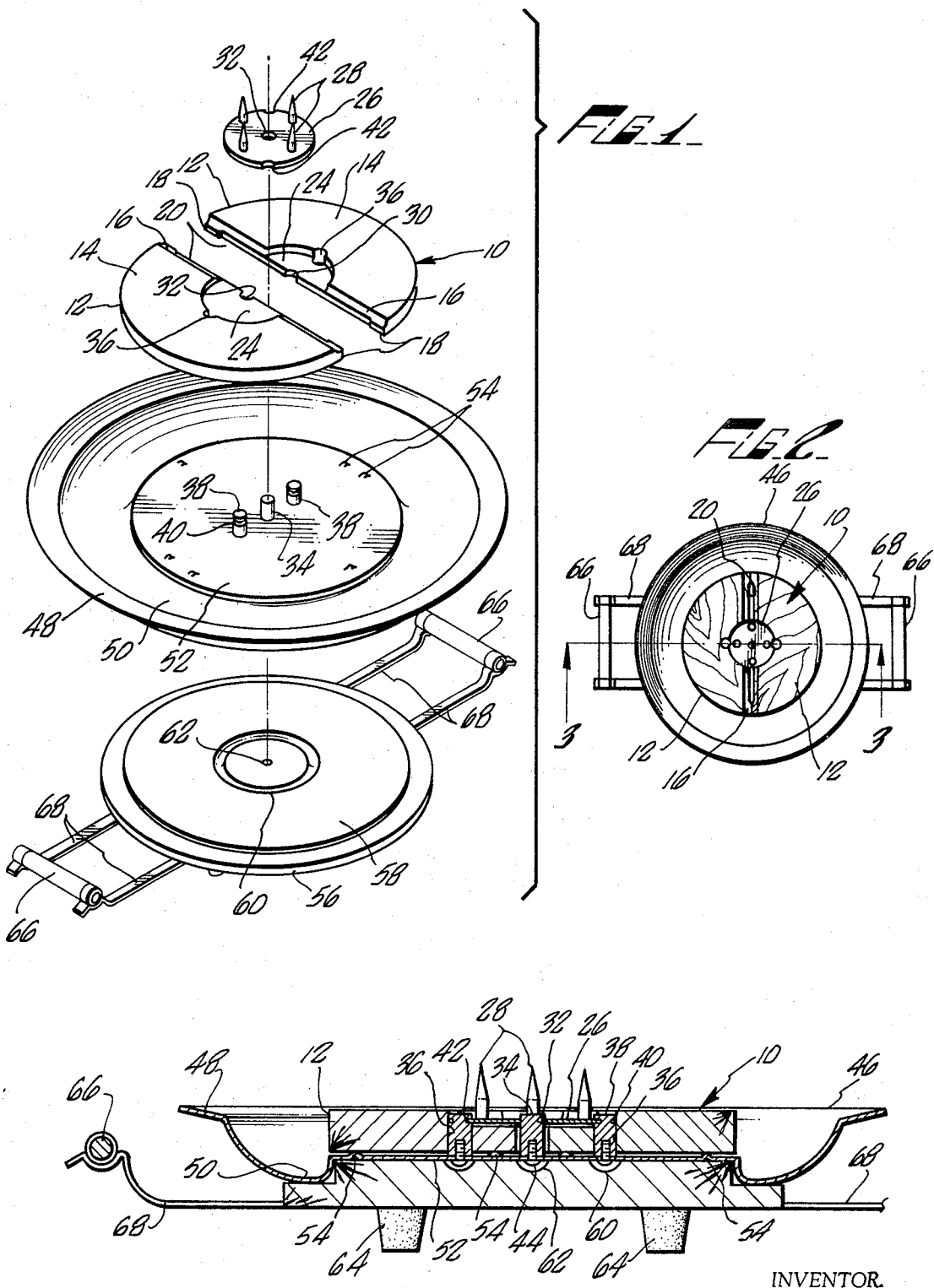

INVENTOR.
JOHN STRATHAUS
BY
Lyon & Lyon
ATTORNEYS.

ROASTING PAN

BACKGROUND OF THE INVENTION

Roasting pans have heretofore employed the use of drainage slots and cavities to provide for fluid drainage. These pans have also utilized removable prongs for securing a roast or other piece of meat. Such a pan is shown in the John Strathaus U.S. Pat. No. 2,751,951. Such roasting pans have certain limitations as to their utility for certain meats. Such devices are considered undesirable for use with steaks, chops, and the like. The flat meat tends to settle into the grooves created for juice run-off, which in turn creates excessive soaking; and in turn, creates a steaming effect on the underside of the meat. This creates an undesirable product, especially when the meat is intended to be turned during roasting. There is also a tendency for the meat to take on the shape of the surface on which it is being cooked. This may become aesthetically undesirable where the meat is being cooked on a roasting pan grooved for drainage.

SUMMARY OF THE INVENTION

The present invention is designed to function both as a roasting pan for large pieces of meat such as a roast which is normally cooked in one position and for which it is desirable to have means for anchoring it to the pan and as a roasting pan for flat pieces of meat such as flank steak, for which it is desirable to have a substantially flat cooking surface and for which there is no need to have an anchoring means. This interchangeability is accomplished through the use of a hardwood center section capable of attaining two configurations. With the hardwood centerpiece in one configuration, deep drainage grooves are provided, and a set of anchoring spikes for fixing the meat to the roasting pan can be locked to the overall structure. When the anchoring spikes are removed and the hardwood centerpiece is inverted, a substantially flat surface is provided without the anchoring spikes. In either configuration, the wood center provides an excellent base for carving as well as roasting.

A metal base is also provided which acts to collect the fluid run-off from the cooking meat. The hardwood centerpiece is raised above this metal base so that the fluids will run off the cooking surface and down into the collecting portion of the metal base. Also, the base provides the same function during carving. The carving of a large piece of meat normally allows the drainage of a great deal of fluid. With this device, the fluids either from cooking or carving are conveniently collected for basting or for making gravy. A convenient holder with insulated handles is also shown and is indicative of the aesthetic value of this roaster which can be utilized further as the serving tray.

Thus, this device provides a new roasting pan which incorporates the fluid run-off and collection means necessary with large pieces of meat and a means for securing anchoring the meat to the pan with the ability to also provide a substantially flat surface for the cooking of steaks, chops, and the like where the run-off and anchoring features would normally become a liability.

BRIEF DESCRIPTION OF THE DRAWINGS

FIG. 1 is an exploded perspective view of the complete device.

FIG. 2 is a top view of the complete device as assembled.

FIG. 3 is a cross-sectional side view of the device taken along the line 3—3 of FIG. 2.

DESCRIPTION OF THE PREFERRED EMBODIMENTS

Figure 4:
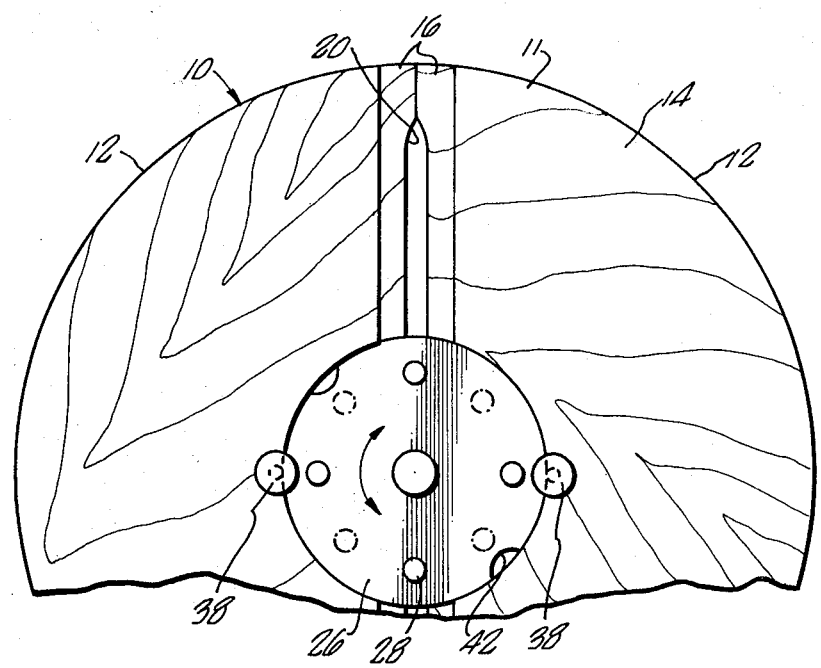
FIG. 4 is a detailed top view showing the hardwood center section in one mode with the anchoring prongs in place and the drainage grooves up.
Figure 5:
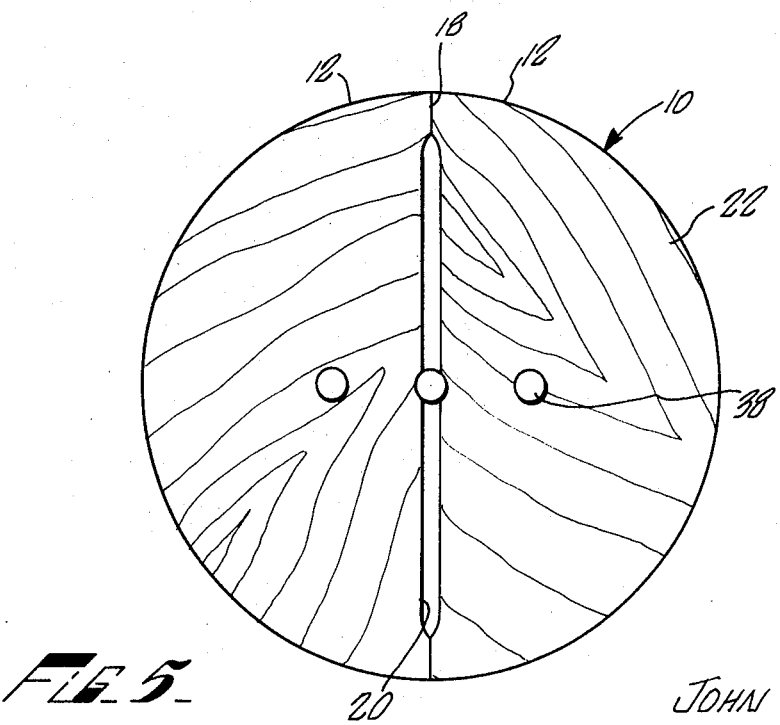
FIG. 5 is a detailed view of the hardwood center section in the second configuration providing a substantially flat surface.

Turning now to the drawings, the device is shown with the hardwood center section 10 shown as being comprised of two halves 12. Each half 12 is made from a hardwood such as soft white oak to resist charring and burning. The hardwood center section 10 could be constructed of one piece rather than the two halves 12 shown. The split configuration is provided for convenience, ease of manufacture, and to enhance drainage, from the center to the gravy tray. Each half 12 of the center section 10 is idential. In the first configuration used for roasting large pieces of meat, the roasting and carving surface 14 is provided with a groove 16 extending across the diameter of the section half 12 adjacent to the mating surface 18. When the two center section halves 12 are assembled, a semi-circular drainage groove is formed by the grooves 16 to aid in carrying off the cooking fluids. It should be noted that other grooves may be carved from the surface 14 if more drainage is found to be required. A second drainage passage is provided through the mating surface 18 by notches 20. The passage created by the notches 20 of course can be eliminated from the device if a perfectly flat surface 22 is desired for the alternate configuration.

A circular recessed surface 24 is provided in surface 14 to accommodate the circular, anchoring prong base 26. The prong base 26 has four prongs 28 attached thereto. For convenience, the prongs 28 should be sharp for easy entry into the meat. Actually, any desired number of prongs 28 may be provided on the prong base 26. It is advantageous to have at least two anchoring prongs 28 to prevent rotation of the meat during handling or carving. Holes 30 and 32 are provided in the hardwood center section 10 and the prong base 26 respectively to accommodate the centering pin 34. Two holes are also provided in the center section 10 to accommodate the locking pins 38. The locking pins 38 are positioned from the center pin 34 a distance which is slightly less than the radius of the prong base 26. Locking grooves 40 are provided in the pins 38 to accommodate the full diameter of the prong base 26. Prong base 26 has two notches 42 from its diameter to allow passage of the prong base 26 between the locking pins 40. With the prong base 26 positioned between the locking pins 40, the prong base 26 is then twisted to cause its diameter to be locked within the locking grooves 40. The centering pin 34 and locking pins 38 are rigidly fixed by screws 44 to the metal base 46. In this manner, the meat is anchored to the base 46 through the prongs 28. The circular surface 24 is recessed in the surface 14 in order that the locking pins 38 need not extend above surface 14 and correspondingly, surface 22.

The metal base 46 has a splatter flange 48 to help retain the cooking fluids. An annular trough 50 is provided for the collection of the cooking fluids. A raised center portion 52 is also provided in the base 46 to keep the hardwood center section from being immersed in the cooking fluids which collect in the trough 50. Several small protrusions 54 are also provided on the raised portions 52 of the base 46 to keep the surfaces 14 or 22 from being emmersed in the cooking fluid. The protrusions 54 also allow for better drainage of the fluid which passes through the notches 20. A holder 56 is shown having a raised center section 58 to fit within the raised portion of the base 52. In this manner, the raised section 58 acts to lock the metal base 46 on the holder 56. The annular groove 60 and the center hole 62 are provided to accommodate the heads of the screws 44. Four resilient base legs 64 are provided to prevent the scratching of any supporting surface and act to thermally insulate the holder from the supporting surface. Handles 66 are preferably made from a material such as wood or plastic which has a low heat conductivity. The handles 66 are attached to the holder 56 through the rigid arm 68.

To use this device for roasting large pieces of meat such as a roast which generates excessive amounts of cooking fluid during roasting and which can be dangerous to the pan, the hardwood center section halves 12 are placed on the base 46 with surfaces 14 up. The prong base 26 is then threaded onto the centering pin 34 with the notches 42 aligned with the locking pins 38. The prong base 26 is then rotated to lock into the locking grooves 40. To provide a substantially flat surface for roasting flat items such as steaks or chops, the hardwood center section halves 12 are placed on the base 46 with surfaces 22 up.

Thus, one convenient roasting and carving pan can be used for both large pieces of meat such as roast and flat items such as steaks or chops. The present embodiments of this invention are to be considered in all respects as illustrative and not restrictive, the scope of the invention being indicated by the appended claims rather than by the foregoing description, and all changes which come within the meaning and range of the equivalency of the claims therefor are intended to be embraced therein.

I claim:

1. A roasting pan for cooking meat comprising a base;
   a center section positioned on said base, and
   means fixed to said base for retaining said center section on said base;
   said center section having two selectible operative surfaces, said first operative surface being substantially planar and said second operative surface being grooved for effective disbursement of fluids;
   said base having a depression for the collection of liquid received from said operative surfaces; and
   an anchoring means for retaining the meat on said second operative surface of the pan.

2. The roasting pan of claim 1, wherein said anchoring means comprises a base and a plurality of sharp prongs.

3. A roasting pan for cooking meat comprising
   a base;
   a center section positioned on said base, and
   means fixed to said base for retaining said center section on said base;
   said center section having two selectible operative surfaces, said first operative surface being substantially planar and said second operative surface being grooved for effective disbursement of fluids;
   said base having a depression for the collection of liquid received from said operative surfaces;
   an anchoring means for retaining the meat on said second operative surface of the pan; and
   locking means for rigidly fixing said anchoring means to said center section for operation in conjunction with said second operative surface.

4. A roasting pan for cooking meat comprising
   a base;
   a center section positioned on said base, and
   means fixed to said base for retaining said center section on said base;
   said center section having two selectible operative surfaces, said first operative surface being substantially planar and said second operative surface being grooved for effective disbursement of fluids;
   said base having a depression for the collection of liquid received from said operative surfaces;
   an anchoring means for retaining the meat on said second operative surface of the pan;
   said center section comprising two semi-circular halves held together by said retaining means.

5. A device for supporting an eatable item while that item is being cooked comprising,
   a base,
   a hardwood platter positioned on said base,
   means for anchoring said eatable items,
   retaining means for fixing said platter and said anchoring means to said base,
   said base having a reservoir for the collection of liquid from said eatable item,
   said hardwood platter having two selectible supporting surfaces for said eatable item on either side of said platter, the first of said supporting surfaces being substantially planar and the second of said supporting surfaces being grooved for effective drainage of said platter surface and having a depression located therein for positioning of said anchoring means, and
   said anchoring means comprising a base and a plurality of sharp prongs.

6. A roasting pan for cooking meat comprising a base.
   a center section positioned on said base, and
   means fixed to said base for retaining said center section on said base;
   said center section having two selectable operative surfaces, said first operative surface being substantially planar and said second operative surface being grooved for effective disbursement of fluids;
   said base having a depression for the collection of liquid received from said operative surfaces; and
   a separate holding means for transporting and supporting said roasting pan.

\* \* \* \* \*